US 8,717,653 B2

(12) United States Patent
Watanabe et al.

(10) Patent No.: US 8,717,653 B2
(45) Date of Patent: May 6, 2014

(54) LIGHT SCANNER AND IMAGE FORMING APPARATUS (75) Inventors: Emi Watanabe, Shimosuwa (JP); Yasushi Mizoguchi, Suwa (JP)

(73) Assignee: Seiko Epson Corporation (JP)

(*) Notice: Subject to any disclaimer, the term of this patent is extended or adjusted under 35 U.S.C. 154(b) by 19 days.

(21) Appl. No.: 13/194,016

(22) Filed: Jul. 29, 2011

(65) Prior Publication Data
US 2012/0038961 A1 Feb. 16, 2012

(30) Foreign Application Priority Data

Aug. 12, 2010 (JP) ................................. 2010-180759

(51) Int. Cl.
*G02B 26/10* (2006.01)

(52) U.S. Cl.
USPC .................. 359/200.7; 359/199.3; 359/221.2; 359/224.1

(58) Field of Classification Search
USPC .......... 359/198.1–199.4, 200.6–200.8, 202.1, 359/221.2, 223.1–225.1, 226.2, 904, 359/290–295, 838, 846, 871, 872; 250/204, 250/559.06, 559.29, 230, 234; 347/255–260; 353/39, 98–99; 385/15–18, 22; 398/12, 19, 45
See application file for complete search history.

(56) References Cited

U.S. PATENT DOCUMENTS

| | | | |
|---|---|---|---|
| 5,912,608 A | 6/1999 | Asada | |
| 6,480,320 B2* | 11/2002 | Nasiri | 359/291 |
| 6,935,759 B1* | 8/2005 | Staker et al. | 359/872 |
| 6,956,684 B2* | 10/2005 | Orcutt | 359/199.1 |
| 7,295,726 B1* | 11/2007 | Milanovic et al. | 385/18 |
| 7,355,317 B2* | 4/2008 | Greywall | 310/309 |

FOREIGN PATENT DOCUMENTS

JP 08-322227 12/1996

* cited by examiner

*Primary Examiner* — Stephone B Allen
*Assistant Examiner* — James McGee
(74) *Attorney, Agent, or Firm* — Harness, Dickey & Pierce, P.L.C.

(57) ABSTRACT

A light scanner includes a light reflection part having light reflectivity, a movable part having the light reflection part and being rotatable around a first rotation center axis and a second rotation center axis, a pair of movable beams extending from the movable part, a displacement part connected to the movable beams and rotating the movable part around the first rotation center axis, a first drive part that drives the displacement part, a pair of drive beams extending from the displacement part in parallel to the light reflection surface and orthogonal to an extension direction of the movable beams, a support frame that supports the drive beams, and a second drive part that rotates the movable part around the second rotation center axis, and the movable beam has a bending part that bendingly deforms due to displacement of the displacement part.

12 Claims, 8 Drawing Sheets

LIGHT SCANNER AND IMAGE FORMING APPARATUS

BACKGROUND

1. Technical Field

The present invention relates to alight scanner for drawing or the like by light scanning, and an image forming apparatus including the light scanner.

2. Related Art

In related art, as disclosed in Patent Document 1 (JP-A-8-322227), an electromagnetic actuator having a function as a light scanner has been known. The electromagnetic actuator includes an insulating substrate on which a pair of permanent magnets are provided and a scanner main body located between the pair of permanent magnets and supported by the insulating substrate, and the scanner main body has the so-called gimbal structure having a frame-shaped support part, a frame-shaped outer movable plate provided inside of the support part, an inner movable plate with a total reflection mirror provided inside of the outer movable plate. Further, the outer movable plate is connected to the support part via a pair of first torsion bars, and the inner movable plate is connected to the outer movable plate via a pair of second torsion bars orthogonal to the first torsion bars. Furthermore, a planar coil is provided on each of the outer movable plate and the inner movable plate.

In the electromagnetic actuator having the above described configuration, magnetic fields generated from the respective planar coils by energization and a magnetic field between the pair of permanent magnets are allowed to act, and the outer movable plate rotates with the inner movable plate around the first torsion bar as a center axis, and the inner movable plate rotates around the second torsion bar as a center axis. Thereby, the electromagnetic actuator can control the reflection direction of light entering the total reflection mirror and functions as a light scanner.

However, in related art, in the electromagnetic actuator, as the first torsion bar rotates, the extension orientation of the center axis of the second torsion bar also rotates and moves. Accordingly, control for directing the total reflection mirror in a predetermined direction by respectively rotating the first torsion bar and the second torsion bar is complex. Further, the magnetic field generated from the planar coil provided on the outer movable plate of the electromagnetic actuator and the magnetic field generated from the planar coil provided on the inner movable plate may easily interfere with each other, and, in that case, the rotation of the total reflection mirror around the center axis of the first torsion bar or the second torsion bar may be different from the intended rotation. Therefore, in the light scanner having the configuration like the electromagnetic actuator in related art, there has been a problem that it is difficult and uneasy to stably and freely rotate the total reflection mirror of the inner movable plate.

SUMMARY

An advantage of some aspects of the invention is to solve at least a part of the problems described above and the invention can be implemented as the following forms or application examples.

APPLICATION EXAMPLE 1

This application example of the invention is directed to a light scanner including: a light reflection part having a light reflection surface, a movable part having the light reflection part and being rotatable around a first rotation center axis and a second rotation center axis orthogonal to the first rotation center axis, a pair of movable beams extending from the movable part and oppositely provided with the movable part in between, a displacement part connected to the movable beams and displacing the movable part to rotate around the first rotation center axis, a first drive part that drives the displacement part, a pair of drive beams extending from the displacement part in parallel to the light reflection surface and orthogonal to an extension direction of the movable beams, a support frame that supports the drive beams, and a second drive part that rotates the movable part around the second rotation center axis, wherein the movable beam has a bending part that bendingly deforms in a thickness direction of the support frame due to displacement of the displacement part.

According to the light scanner, the light reflection surface is displaced in conjunction with the movable part and reflects incident light in an arbitrary direction. The movable part is displaced with activation of the movable beams driven by the displacement part of a first drive unit. Here, in a non-driven state, the movable beam has a form extending along a first axis as one axis with the displacement part on a surface in parallel to the light reflection surface, and the displacement part is supported by the drive beam extending in the orthogonal direction to the movable beams on the surface in parallel to the light reflection surface. That is, by the rotation of the displacement part around the drive beam, the pair of movable beams with the movable part in between respectively rotate and displace the movable part. Then, the bending part provided in the movable part has a function of flexibly bending in response to the respective rotations of the movable beams and reliably displacing the movable part along the first axis. Further, the light scanner includes a second drive unit, and the second drive unit displaces the movable part along a second axis in a direction different from that of the first axis because the function of the displacement part of the first drive unit is provided to the movable part itself. That is, in the second drive unit, the movable part can be directly displaced not via the movable beams or the drive beams. In this regard, the movable beams and the bending parts fulfill a function of preventing the displacement provided to the movable part by the second drive part from affecting the displacement part of the first drive unit. Similarly, the movable beams and the bending parts fulfill a function of preventing the displacement by the first drive part from affecting the second drive unit. Thereby, in the light scanner, the movable part may individually and reliably deal with individual displacement provision of the first drive unit or the second drive unit along the first axis or the second axis, respectively, and can be freely and reliably displaced. Further, since the second drive unit has no movable beam or drive beam, the light scanner can be made smaller.

APPLICATION EXAMPLE 2

In the light scanner according to the above application example, it is preferable that the displacement part includes a first permanent magnet, the first drive part includes a coil that generates a magnetic field acting on the first permanent magnet, the movable part includes a second permanent magnet, and the second drive part includes a coil that generates a magnetic field acting on the second permanent magnet.

According to the configuration, the first drive unit has a configuration of rotating the displacement part by generating a magnetic field from the coil of the first drive part for the first permanent magnet provided in the displacement part and attracting either pole side of the first permanent magnet to the coil. The movable beams also rotate by the rotation of the displacement part and the movable part is displaced along the first axis direction. On the other hand, the second drive unit has a configuration of directly displacing the movable part not via a beam or the like by generating a magnetic field from the coil of the second drive part for the second permanent magnet provided in the movable part and attracting either pole side of the second permanent magnet to the coil. As described above, the light scanner can freely displace the movable part by the simple configuration of changing the polarities of the coils.

APPLICATION EXAMPLE 3

In the light scanner according to the above application example, it is preferable that the first permanent magnet has poles oppositely located in a direction orthogonal to the light reflection surface, the respective first permanent magnets provided in the respective displacement parts have poles located at the side of the light reflection surface with different polarities from each other.

According to the configuration, the first permanent magnet extends in the orthogonal direction to the light reflection surface in a non-driven state, and the pole at the extending end is an N-pole or an S-pole. In this case, the respective displacement parts on both ends of the movable beam, regarding the first permanent magnet provided in the displacement part on one side is, if the pole at the end side located at the same side in the direction in which the light reflection surface is directed is the N-pole, the first permanent magnet provided in the displacement part on the other side is provided so that the pole at the end side located at the same side in the direction in which the light reflection surface is directed may be the S-pole. That is, the respective poles located at the side of the light reflection surface have different polarities from each other. Here, the displacement of tilting the movable part in the light scanner is enabled by the rotation of the pair of movable beams with the movable part in between in the same direction. To rotate the movable beams in this manner, with the coil sides opposed to the respective first permanent magnets as the S-poles, the N-pole side ends of the first permanent magnets may be attracted to the coils. Alternatively, with the coil sides opposed to the respective first permanent magnets as the N-poles, the S-pole side ends of the first permanent magnets may be attracted to the coils. That is, the displacement parts are rotated in the same direction. In this case, the coils of the first drive unit located on both ends of the movable beams have the same polarity at the side directed toward the movable part and repel each other, and the magnetic field by the coil of the first drive unit has little influence on the coil of the second drive unit. Therefore, the second drive unit can individually displace the movable part without influence of the magnetic field of the first drive unit.

APPLICATION EXAMPLE 4

In the light scanner according to the above application example, it is preferable that the second permanent magnet is provided in the movable part so that poles may be opposed in a direction along the light reflection surface and orthogonal to the extension direction of the movable beams.

According to the configuration, by providing the second permanent magnet so that its poles are opposed in the direction orthogonal to the extension direction of the movable beams on the surface in parallel to the light reflection surface, the second drive unit can provide the displacement in a direction orthogonal to the displacement provided by the first drive unit to the movable part. As described above, when the displacements provided by the first drive unit and the second drive unit are orthogonal to each other, the displacement of the movable part may be specified easily, and the direction of the light reflected by the movable part can be controlled easily. Further, the length of the second permanent magnet is approximation nearly equally to the outer shape length of the movable part, and the moment for rotating the movable part may be easily secured and the movable part can be reliably displaced.

APPLICATION EXAMPLE 5

In the light scanner according to the above application example, it is preferable that the second permanent magnet is provided in the movable part to support the light reflection part.

According to the configuration, the second permanent magnet has a function as the support part that supports the light reflection part having the light reflection surface in addition to the function as the second drive unit. Since the second permanent magnet supports the light reflection surface as the support part, the support part only for supporting the light reflection part may be eliminated and reduction of magnetic field intensity necessary for displacement due to weight reduction of the movable part, reduction of the number of parts, or the like may be realized.

APPLICATION EXAMPLE 6

In the light scanner according to the above application example, it is preferable that the light reflection surface has a larger area than that of the movable part.

According to the configuration, the light reflection surface may be set larger than the movable part. For example, the surface can be expanded from the movable part position to the position over the bending part of the movable beam, and can reflect more luminous fluxes. The reason is that a gap is provided between the light reflection part having the light reflection surface and the movable part by the support part, and, if the movable part tilts, the light reflection part can avoid contact with the movable beams by the amount of the gap.

APPLICATION EXAMPLE 7

This application example of the invention is directed to an image forming apparatus including: a light source, and a light scanner that performs scanning with light from the light source, wherein the light scanner includes a light reflection part having a light reflection surface, a movable part having the light reflection part and being rotatable around a first rotation center axis and a second rotation center axis orthogonal to the first rotation center axis, a pair of movable beams extending from the movable part and oppositely provided with the movable part in between, a displacement part connected to the movable beams and rotating the movable part around the first rotation center axis, a first drive part that drives the displacement part, a pair of drive beams extending from the displacement part in parallel to the light reflection surface and orthogonal to an extension direction of the movable beams, a support frame that supports the drive beams, and a second drive part that rotates the movable part around the second rotation center axis, wherein the movable beam has a bending part that bendingly deforms in a thickness direction of the support frame due to displacement of the displacement part.

According to the image forming apparatus, the light scanner is provided, and, according to the light scanner, the light reflection surface is displaced in conjunction with the movable part and reflects incident light in an arbitrary direction. The movable part is displaced with activation of the movable beams driven by the displacement part of the first drive unit. Here, in a non-driven state, the movable beam has a form extending along a first axis as one axis with the displacement part on a surface in parallel to the light reflection surface, and the displacement part is supported by the drive beam extending in the orthogonal direction to the movable beams on the surface in parallel to the light reflection surface. That is, by the rotation of the displacement part around the drive beam, the pair of movable beams with the movable part in between respectively rotate and displace the movable part. Then, the bending part provided in the movable part has a function of flexibly bending in response to the respective rotations of the movable beams and reliably displacing the movable part along the first axis. Further, the light scanner includes a second drive unit, and the second drive unit displaces the movable part along a second axis in a direction different from that of the first axis because the function of the displacement part of the first drive unit is provided to the movable part or otherwise. That is, in the second drive unit, the movable part can be displaced not via the movable beams or the drive beams. In this regard, the movable beams and the bending parts fulfill a function of preventing the displacement of the first drive part or the second drive part from affecting the displacement part of the other drive part. Thereby, in the light scanner, the movable part may reliably deal with individual displacement provision of the first drive unit or the second drive unit along the first axis or the second axis, respectively, and can be freely and reliably displaced. Further, since the second drive unit has no movable beam or drive beam, the light scanner can be made smaller. The image forming apparatus provided with such a light scanner can form an arbitrary image stably and can be miniaturized.

APPLICATION EXAMPLE 8

In the image forming apparatus according to the above application example, it is preferable that the displacement part includes a first permanent magnet, the first drive part includes a coil that generates a magnetic field acting on the first permanent magnet, the movable part includes a second permanent magnet, and the second drive part includes a coil that generates a magnetic field acting on the second permanent magnet.

According to the configuration, the displacement part is rotated by generating a magnetic field from the coil of the first drive part for the first permanent magnet provided in the displacement part and attracting either pole side of the first permanent magnet to the coil. The movable beams also rotate by the rotation of the displacement part and the movable part is displaced along the first axis direction. On the other hand, the movable part is directly displaced not via a beam or the like by generating a magnetic field from the coil of the second drive part for the second permanent magnet provided in movable part and attracting either pole side of the second permanent magnet to the coil. As described above, the light scanner can freely displace the movable part by the simple configuration of changing the polarities of the coils.

APPLICATION EXAMPLE 9

In the image forming apparatus according to the above application example, it is preferable that the first permanent magnet has poles oppositely located in a direction orthogonal to the light reflection surface, the respective first permanent magnets provided in the respective displacement parts have poles located at the side of the light reflection surface with different polarities from each other.

According to the configuration, the first permanent magnet extends in the orthogonal direction to the light reflection surface in a non-driven state, and the pole at the extending end side is an N-pole or an S-pole. In this case, the respective displacement parts on both ends of the movable beam, regarding the first permanent magnet provided in the displacement part on one side is, if the pole at the end side located at the same side in the direction in which the light reflection surface is directed is the N-pole, the first permanent magnet provided in the displacement part on the other side is provided so that the pole at the end side located at the same side in the direction in which the light reflection surface is directed may be the S-pole. That is, the respective poles located at the side of the light reflection surface have different polarities from each other. Here, the displacement of tilting the movable part in the light scanner is enabled by the rotation of the pair of movable beams with the movable part in between in the same direction. To rotate the movable beams in this manner, with the coil sides opposed to the respective first permanent magnets as the S-poles, the N-pole side ends of the first permanent magnets may be attracted to the coils. Alternatively, with the coil sides opposed to the respective first permanent magnets as the N-poles, the S-pole side ends of the first permanent magnets may be attracted to the coils. That is, the displacement parts are rotated in the same direction. In this case, the coils of the first drive unit located on both ends of the movable beams have the same polarity at the side directed toward the movable part and repel each other, and the magnetic field by the coil of the first drive unit has little influence on the coil of the second drive unit. Therefore, the second drive unit can individually displace the movable part without influence of the magnetic field of the first drive unit.

APPLICATION EXAMPLE 10

In the image forming apparatus according to the above application example, it is preferable that the second permanent magnet is provided in the movable part so that poles may be opposed in a direction along the light reflection surface and orthogonal to the extension direction of the movable beams.

According to the configuration, by providing the second permanent magnet so that its poles are opposed in the direction orthogonal to the extension direction of the movable beam on the surface in parallel to the light reflection surface, the second drive unit can provide the displacement in a direction orthogonal to the displacement provided by the first drive unit to the movable part. As described above, when the displacements provided by the first drive unit and the second drive unit are orthogonal to each other, the displacement of the movable part may be specified easily, and the direction of the light reflected by the movable part can be controlled easily. Further, the length of the second permanent magnet is approximation nearly equally to the outer shape length of the movable part, and the moment for rotating the movable part may be easily secured and the movable part can be reliably displaced.

APPLICATION EXAMPLE 11

In the image forming apparatus according to the above application example, it is preferable that the second permanent magnet is provided in the movable part to support the light reflection part.

According to the configuration, the second permanent magnet has a function as the support part that supports the light reflection part having the light reflection surface in addition to the function as the second drive unit. Since the second permanent magnet supports the light reflection surface as the support part, the support part only for supporting the light reflection part may be eliminated and reduction of magnetic field intensity necessary for displacement due to weight reduction of the movable part, reduction of the number of parts, or the like may be realized.

APPLICATION EXAMPLE 12

In the image forming apparatus according to the above application example, it is preferable that the light reflection surface has a larger area than that of the movable part.

According to the configuration, the light reflection surface may be set larger than the movable part. For example, the surface can be expanded from the movable plate position to the position over the bending part of the movable beam, and can reflect more luminous fluxes. The reason is that a gap is provided between the light reflection part having the light reflection surface and the movable part by the support part, and, if the movable part tilts, the light reflection part can avoid contact with the movable beams by the amount of the gap.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
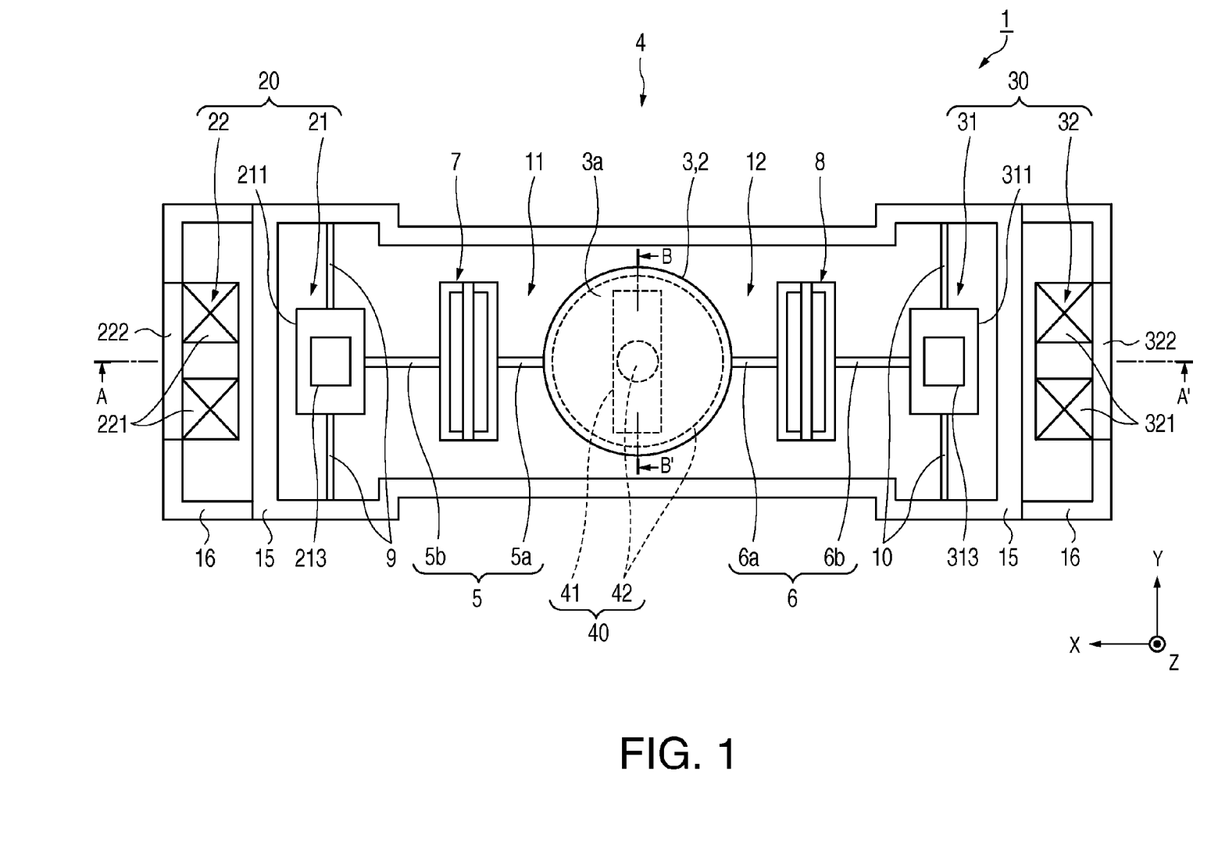
FIG. 1 is a plan view showing a configuration of a light scanner according to the invention.
Figure 2:
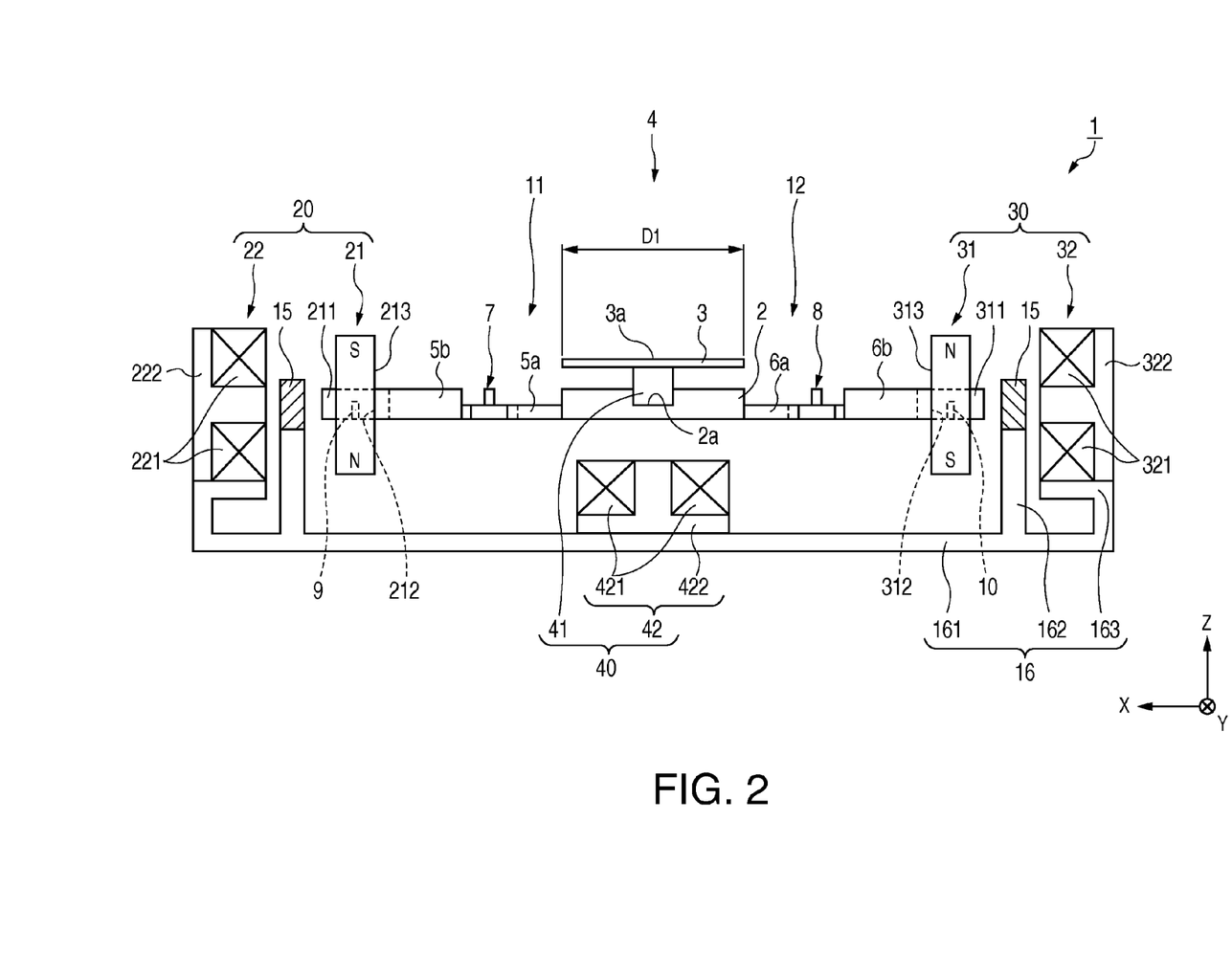
FIG. 2 is a sectional view showing the configuration of the light scanner.
Figure 3:
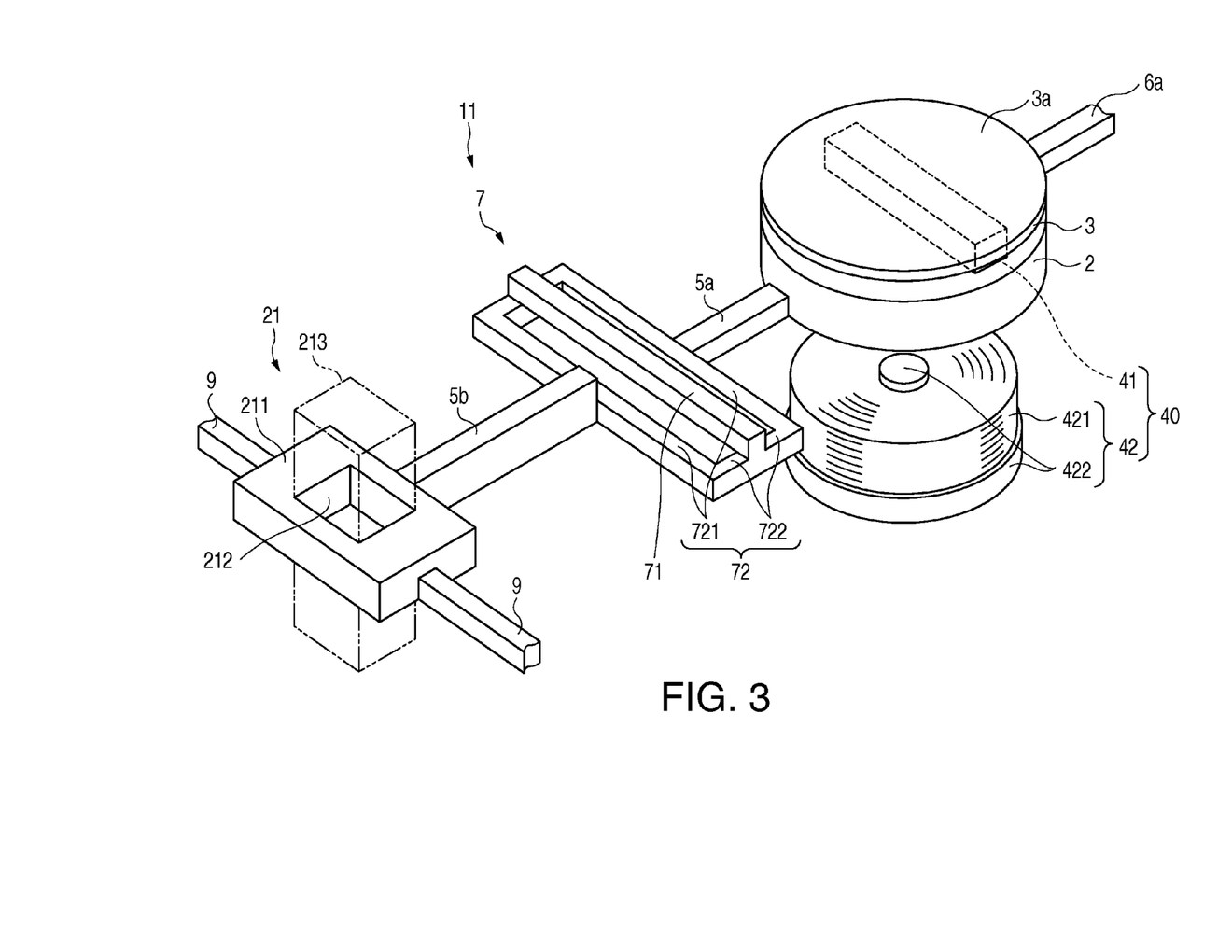
FIG. 3 is a perspective view showing a movable beam and a drive unit for displacing a reflection plate.

As below, an example of a preferred embodiment of a light scanner and an image forming apparatus of the invention will be explained with reference to the accompanying drawings.
Embodiment FIG. 1 is a plan view showing a configuration of a light scanner according to the embodiment of the invention. Further, FIG. 2 is a sectional view showing the configuration of the light scanner and shows a section along A-A' of the light scanner shown in FIG. 1. Furthermore, FIG. 3 is a perspective view showing a movable beam and a drive unit for displacing a reflection plate. As shown in FIGS. 1 and 2, the light scanner 1 includes a movable part 2, two coupling parts 11, 12 connected to the movable part 2, first drive units 20, 30 provided on ends of the coupling parts 11, 12 at opposite sides to the movable part 2 for displacing the movable part 2 via the coupling parts 11, 12, a support frame 15 that supports the first drive units 20, 30, a base 16 that supports the support frame 15, and a second drive unit 40 for directly providing displacement different from those of the first drive units 20, 30 to the movable part 2. These movable part 2, coupling parts 11, 12, first drive units 20, 30, and support frame 15 form a vibrating substrate 4. Further, the movable part 2 supports a reflection plate (light reflection member) 3 having a light reflection surface 3a via a support member 41. Note that, as below, as shown in the plan view of the light scanner in FIG. 1, the longitudinal direction of the vibrating substrate 4 in which the coupling parts 11, 12 extend is the X-axis (the first axis in SUMMARY), a plane formed by the X-axis and the Y-axis (the second in SUMMARY) is in parallel to the light reflection surface 3a in a non-driven state, and the Z-axis orthogonal to the plane is aligned with the thickness direction of the reflection plate 3 having the light reflection surface 3a.

First, the vibrating substrate 4 will be explained. The support frame 15 of the vibrating substrate 4 has a frame shape for supporting the movable part 2 and is provided to surround the movable part 2. The movable part 2 connected to the inner sides of the support frame 15 by the coupling parts 11, 12 has a circular flat plate shape, the reflection plate 3 supported by the movable part 2 has a circular shape having a diameter D1 nearly the same as (as approximation to) the diameter (outer shape length) of the movable part 2, and the light reflection surface 3a is provided to be directed toward the opposite direction to the base 16. The reflection surface 3a is obtained by forming a metal film of gold, silver, aluminum, or the like, for example, by vapor deposition or the like, and formed by aluminum in this case.

Further, the coupling parts 11, 12 are formed symmetrically along the X-axis direction with respect to the movable part 2, and the coupling part 11 has a displacement part 21, a pair of drive beams 9 connecting the displacement part 21 and the support frame 15, and a movable beam 5 connecting the displacement part 21 and the movable part 2 and having a bending part 7 in the middle. Furthermore, the coupling part 12 has a displacement part 31, a pair of drive beams 10 connecting the displacement part 31 and the support frame 15, and a movable beam 6 connecting the displacement part 31 and the movable part 2 and having a bending part 8 in the middle.

Here, the detailed configuration of the coupling parts 11, 12 will be explained by taking the coupling part 11 as an example with reference to FIG. 3. The coupling part 12 has the same configuration as that of the coupling part 11. As shown in FIG. 3, the pair of drive beams 9 are oppositely provided in the Y-axis (FIG. 1) direction via the displacement part 21, and support the displacement part 21 on both ends. Further, each drive beam 9 has a rod shape extending in the Y-axis direction in the form that can be torsionally deformed around the Y-axis direction. The drive beams 9 are coaxially provided and torsionally deformed around the axis, and thereby, the displacement part 21 is rotated (displaced).

The displacement part 21 is provided separately from the movable part 2 in the X-axis direction (FIG. 1), and a displacement body 211 of the displacement part 21 is supported on both ends by the pair of drive beams 9. Further, a through hole 212 is formed in the displacement body 211, and a first permanent magnet 213 is inserted into the through hole 212 and fixed by fitting (press-fitting) or an adhesive. Furthermore, the shape in the plan view of the displacement part 21 is a rectangular shape with the longitudinal side in the Y-axis direction, and may suppress the width (the length in the X-axis direction) of the displacement body 211 while securing the space for fixing the first permanent magnet 213. By suppressing the width of the displacement body 211, the moment of inertia generated when the displacement body 211 rotates around the axis in the Y-axis direction may be suppressed, the responsiveness of the displacement part 21 becomes higher, and the faster rotation can be performed. If the responsiveness of the displacement part 21 becomes higher, production of unintended vibration due to the rotation of the displacement part 21 may be suppressed, and that is effective at reversal when the rotational direction is switched. Accordingly, the light scanner 1 may stably be driven.

Further, the displacement part 21 is connected to the movable part 2 by the movable beam 5. The movable beam 5 is provided to extend in the X-axis direction, and has the above described bending part 7, a movable part-side beam 5a connecting the bending part 7 and the movable part 2, and a displacement part-side beam 5b connecting the bending part 7 and the displacement body 211 of the displacement part 21. The movable part-side beam 5a and the displacement part-side beam 5b respectively have rod shapes extending in the X-axis direction and are coaxially provided.

The displacement part-side beam 5b of the movable beam 5 is preferably set to hardness not largely deformable at driving of the light scanner 1, and more preferably set to hardness substantially non-deformable. On the other hand, the movable part-side beam 5a is torsionally deformable around the axis of the beam extending in the X-axis direction. Since the movable beam 5 has the displacement part-side beam 5b as a hard part that is substantially non-deformable and the movable part-side beam 5a as a torsionally deformable part, the movable part 2 may be rotated stably around the respective axes of the X-axis and the Y-axis. Here, "non-deformable" refers to that bending or curving in the Z-axis direction or torsional deformation around the beams does not substantially occur. The movable part-side beam 5a and the displacement part-side beam 5b are connected via the bending part 7, and the bending part 7 fulfils a function as a node when the movable beam 5 bendingly deforms, and a function of relaxing (absorbing) torque generated due to the torsional deformation of the movable part-side beam 5a and preventing or suppressing transfer of the torque to the displacement part-side beam 5b.

The bending part 7 has a non-deformable part 71 and a stress relaxing part 72. The stress relaxing part 72 has a pair of deformable parts 721 respectively provided at the side of the movable part-side beam 5a and the side of the displacement part-side beam 5b of the non-deformable part 71, and a connection part 722 for connecting the respective deformable parts 721 to the non-deformable part 71. Further, the non-deformable part 71 has a rod shape extending in the Y-axis direction and is set to hardness not substantially deformable at driving of the light scanner 1. According to the configuration, the movable beam 5 may be bent around the non-deformable part 71. That is, the stress relaxing part 72 may be allowed to reliably fulfill the function as a node and the light scanner 1 may be stably driven.

Further, the pair of deformable parts 721 are respectively provided symmetrically with respect to the non-deformable part 71, have rod shapes extending in the Y-axis direction, and arranged separately in the X-axis direction from each other in parallel. These deformable parts 721 have forms that can torsionally deform around their center axes. Furthermore, the deformable part 721 located at the side of the movable part 2 is connected to one end of the movable part-side beam 5a nearly at the center in the longitudinal direction, and connected to the non-deformable part 71 at their ends via a pair of connection parts 722. Similarly, the deformable part 721 located at the side of the displacement part 21 is connected to one end of the displacement part-side beam 5b nearly at the center in the longitudinal direction, and connected to the non-deformable part 71 at their ends via a pair of connection parts 722. These connection parts 722 have rod shapes extending in the X-axis direction and forms that can curve in the Z-axis direction and torsionally deform around their center axes. According to the coupling part 11 having the configuration, the movable part 2 can rotate more smoothly around the center axis in the X-axis direction or the Y-axis direction.

On the other hand, the coupling part 12 has the same function as that of the coupling part 11, and includes a movable beam 6 (a movable part-side beam 6a and a displacement part-side beam 6b), a bending part 8, a displacement part 31 (a displacement body 311, a through hole 312, and a first permanent magnet 313), and drive beams 10.

In the light scanner 1 having the above described configuration, the vibrating substrate 4 is integrally formed by etching an SOI substrate or the like. The SOI substrate is a substrate in which a first Si layer, an $SiO_2$ layer, and a second Si layer stacked in this order. In the vibrating substrate 4, parts to be positively deformed and parts not to be deformed (not desired to be deformed) are mixed. Accordingly, the part not to be deformed includes all of the three layers and the part positively deformed includes only the second Si layer or two layers of the second Si layer and the $SiO_2$ layer. That is, by making the thickness of the SOI substrate different, the vibrating substrate 4 in which parts to be deformed and parts not to be deformed are mixed may be formed easily.

The vibrating substrate 4 in the light scanner 1 is supported by the base 16 as shown in FIG. 2. The base 16 has a box shape (open-topped box shape), and a base part 161 having a flat plate shape, a frame part 162 stood along the edge of the base part 161, and a mount part 163 provided on both ends in the X-axis direction for mounting coil parts (first drive part) 22, 32. The base 16 is bonded to the support frame 15 of the vibrating substrate 4 and supports the vibrating substrate 4. The base 16 includes glass or silicon as a main material and, in this case, is formed using silicon. The base 16 and the support frame 15 are bonded using an adhesive, however, not limited to that, but various bonding methods such as anodic bonding may be used.

Next, a configuration of displacing the movable part 2 and the reflection plate 3 by displacement of the displacement parts 21, 31 and a configuration of providing displacement different from the displacement by the displacement parts 21, 31 to the movable part 2 and the reflection plate 3 will be explained. First, the displacement of the displacement parts 21, 31 will be explained.

As shown in FIGS. 1 and 2, the first drive unit 20 having the displacement part 21 has the coil part (first drive part) 22 oppositely provided at the opposite side to the movable part 2 with respect to the displacement part 21, and the first drive unit 30 having the displacement part 31 has the coil part (first drive part) 32 oppositely provided at the opposite side to the movable part 2 with respect to the displacement part 31. The first drive unit 20 is provided to be coupled to the coupling part 11 and the first drive unit 30 is provided to be coupled to the coupling part 12. The first drive units 20, 30 have the same configuration and the same function, and the case of the first drive unit 20 will be explained.

In the first drive unit 20, the first permanent magnet 213 of the displacement part 21 has a rod shape and is magnetized in its longitudinal direction. That is, the first permanent magnet 213 has one end side in the longitudinal direction as an S-pole and the other end side as an N-pole and, in this case, the same side as the side to which the light reflection surface 3a is directed is the S-pole. Further, the first permanent magnet 213 is inserted into the through hole 212 of the displacement body 211 in the Z-axis direction, and bonded and fixed to the displacement body 211 in the nearly center position in the longitudinal direction. As the first permanent magnet 213, a magnetized hard magnetic material such as a neodymium magnet, a ferrite magnet, a samarium-cobalt magnet, an alnico magnet or a bond magnet may be used and, in this case, a neodymium magnet is used.

The coil part 22 includes a coil fixing part 222 mounted on the mount part 163 of the base 16 and a coil 221 wound around a portion projecting in the X-axis direction of the coil fixing part 222. The projecting portion is formed using a soft magnetic material of iron or the like as a core, and thereby, may generate a magnetic field more efficiently. Further, the coil 221 may generate a magnetic field in the X-axis direction acting on the first permanent magnet 213, and a state in which the first permanent magnet 213 side of the coil part 22 is an N-pole and the opposite side is an S-pole and a state in which the first permanent magnet 213 side of the coil part 22 is an S-pole and the opposite side is an N-pole may be produced.

The magnetic field can be generated when a power supply (not shown) is electrically connected to the coil 221 and a voltage is applied from the power supply to the coil 221. Here, the power supply may select and apply an alternating-current voltage and a direct-current voltage, and may change the intensity and frequency thereof when applying the alternating-current voltage. Furthermore, an offset voltage (direct-current voltage) may be superimposed thereon.

Further, also, in the first drive unit 30, the first permanent magnet 313 of the displacement part 31 and a coil 321 and a coil fixing part 322 of the coil part (first drive part) 32 have the same advantages as those of the first drive unit 20. In this case, the first permanent magnet 313 has an arrangement in which the same side with the side to which the light reflection surface 3a is directed is an N-pole, and has a different polar arrangement from that of the first permanent magnet 213 of the first drive unit 20. That is, the first permanent magnet 213 and the first permanent magnet 313 have poles located at the light reflection surface 3a side with different polarities from each other.

Figure 4A:
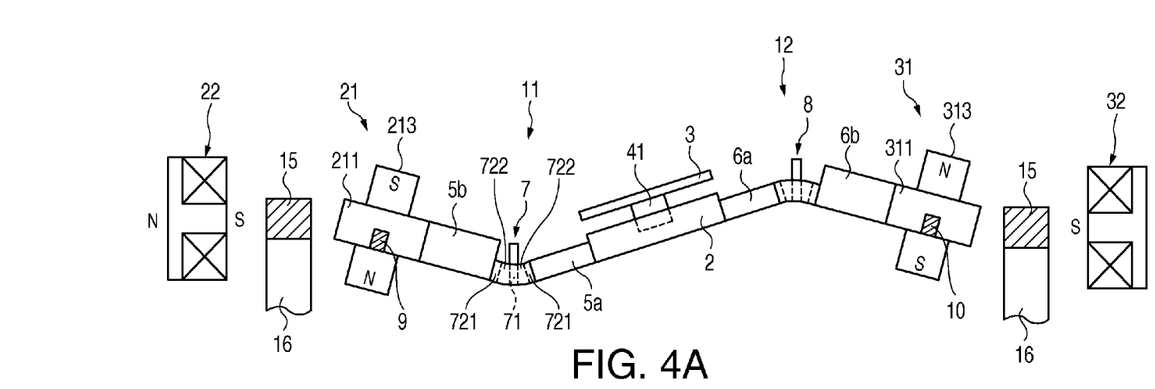
FIG. 4A is a sectional view showing driving of a first drive unit of the light scanner.
Figure 4B:
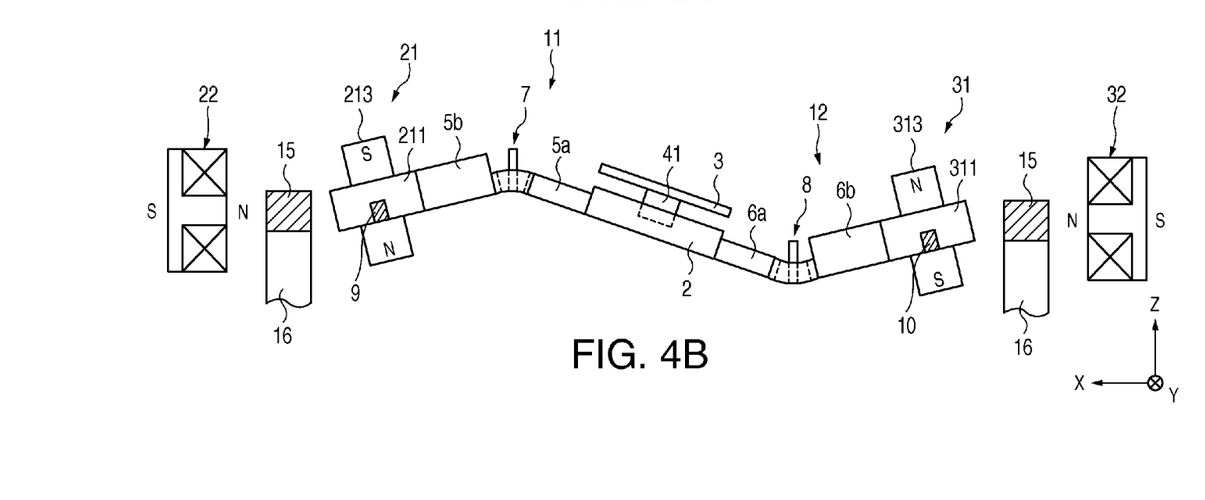
FIG. 4B is a sectional view showing the driving of the first drive unit.

Subsequent to the displacement of the displacement parts 21, 31, rotation of the movable part 2 by the first drive units 20, 30 will be explained. In this case, the movable part 2 rotates around the axis in the Y-axis direction. FIG. 4A is a sectional view showing driving of the first drive unit of the light scanner. FIG. 4B is a sectional view showing the driving of the first drive unit, and shows the driving in the different direction from that in FIG. 4A. FIGS. 4A and 4B are the sectional views corresponding to the section along A-A' in FIG. 1. First, alternating-current voltages are applied to the coils 221, 321 (FIG. 2) of the coil parts 22, 32 from the power supply so that the first state in which the first permanent magnet 213 side of the coil part 22 is an S-pole and the first permanent magnet 313 side of the coil part 32 is an S-pole as well and a second state in which the first permanent magnet 213 side of the coil part 22 is an N-pole and the first permanent magnet 313 side of the coil part 32 is an N-pole as well may be alternately and periodically switched. In the light scanner 1, it is preferable that the alternating-current voltages have the same waveform as each other, that is, have the same intensity and the same frequency.

In the first state shown in FIG. 4A, the N-pole of the first permanent magnet 213 is attracted to the coil part 22 and the S-pole moves away from the coil part 22, and the displacement body 211 rotates and tilts to direct the surface at the S-pole side of the first permanent magnet 213 toward the side of the movable part 2 while torsionally deforming the pair of drive beams 9. At the same time, the N-pole of the first permanent magnet 313 is attracted to the coil part 32 and the S-pole moves away from the coil part 32, and the displacement body 311 rotates and tilts to direct the surface at the S-pole side of the first permanent magnet 313 toward the side of the movable part 2 while torsionally deforming the pair of drive beams 10. That is, both of the displacement parts 21, 31 rotate clockwise in FIG. 4A.

With the rotation of the displacement parts 21, 31, the displacement part-side beam 5b tilts to direct the end at the movable part 2 side toward the base 16 side, the displacement part-side beam 6b tilts to direct the end at the movable part 2 side toward the opposite side to the base 16 side, and the ends of the displacement parts 21, 31 at the movable part 2 side are shifted in the Z-axis direction. Thereby, the deformable parts 721 of the bending part 7 torsionally deform around their center axes and the connection parts 722 curvedly deform. The bending part 8 similarly torsionally deforms and curvedly deforms and the movable part-side beams 5a, 6a and the movable part 2 integrally rotate counter-clockwise in FIG. 4A.

On the other hand, in the second state shown in FIG. 4B, opposite deformation to that in the above described first state occurs. That is, the S-pole of the first permanent magnet 213 is attracted to the coil part 22 as the N-pole and the S-pole of the first permanent magnet 313 is attracted to the coil part 32 as the N-pole, and the movable part 2 rotates clockwise in FIG. 4B. In this manner, by alternately and periodically switching between the first state and the second state, the movable part 2 may be freely rotated around the axis in the Y-axis direction.

Figure 5A:
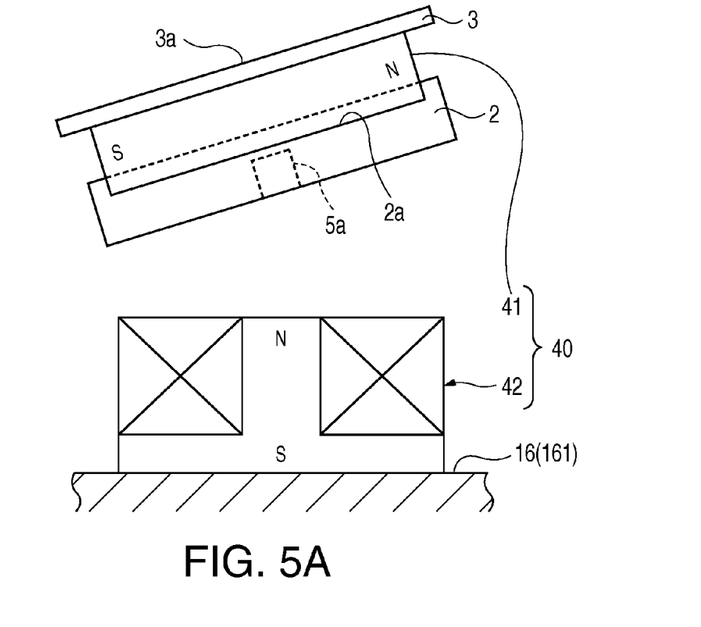
FIG. 5A is a sectional view showing driving of a second drive unit of the light scanner.
Figure 5B:
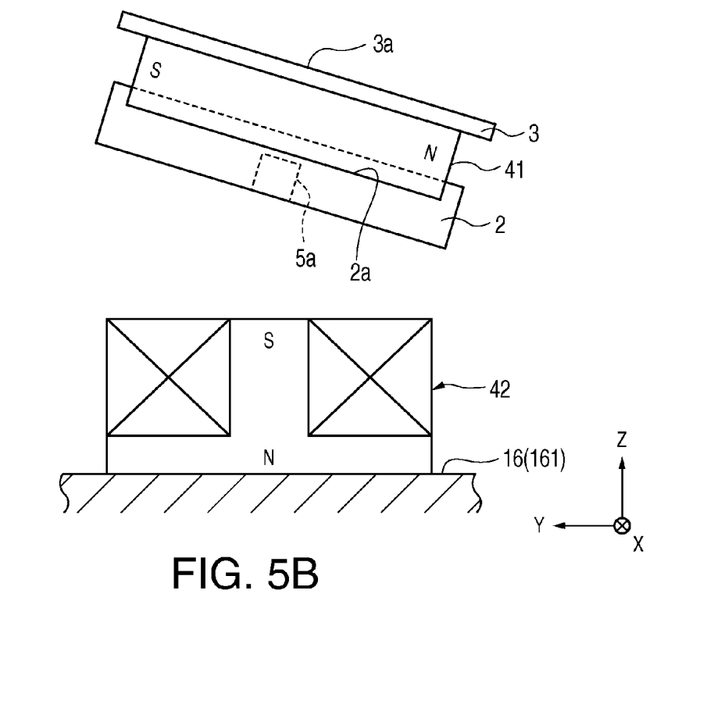
FIG. 5B is a sectional view showing the driving of the second drive unit.

Next, the configuration of providing displacement different from the displacement by the displacement parts 21, 31 to the movable part 2 and the reflection plate 3 will be explained. FIG. 5A is a sectional view showing driving of the second drive unit of the light scanner. FIG. 5B is a sectional view showing the driving of the second drive unit, and shows the driving in the different direction from that in FIG. 5A. FIGS. 5A and 5B are the sectional views corresponding to the section along B-B' in FIG. 1. As below, the explanation will be made with reference to FIGS. 1, 2, and 3 in addition to the FIGS. 5A and 5B. In this case, the movable part 2 and the reflection plate 3 rotate around the axis in the X-axis direction, and the rotation of the movable part 2 is caused by the second drive unit 40.

The second drive unit 40 has the support member 41 as a second permanent magnet provided in the movable part 2 for supporting the reflection plate 3, and a coil part (second drive part) 42 provided in the base part 161 of the base 16 oppositely to the movable part 2. The support member 41 as the second permanent magnet has a rod shape in a nearly equal length as the diameter of the movable part 2, and is provided along the Y-axis direction of the reflection plate 3 in a non-driven state. In the movable part 2, an alignment guide 2a as a groove for arranging the support member 41 in an accurate position is provided for easy mounting of the support member 41.

The coil part 42 includes a coil fixing part 422 mounted on the base part 161 and a coil 421 wound around a portion projecting in the Z-axis direction of the coil fixing part 422. The projecting portion is formed using a soft magnetic material of iron or the like as a core, and thereby, may generate a magnetic field more efficiently. Further, the coil 421 may generate a magnetic field in the Z-axis direction acting on the support member 41, and a state in which the support member 41 side is an N-pole and the opposite side is an S-pole and a state of the opposite polar arrangement in the coil part 42 may be alternately and periodically switched.

As shown in FIG. 5A, in the coil part 42, when the side of the support member 41 as the second permanent magnet is an N-pole, the S-pole of the support member 41 is attracted to the coil part 42 and the N-pole moves away from the coil part 42, and the movable part 2 rotates counter-clockwise and tilts while torsionally deforming the movable part-side beams 5a, 6a. On the other hand, as shown in FIG. 5B, in the coil part 42, when the side of the support member 41 as the second permanent magnet is an S-pole, the N-pole of the support member 41 is attracted to the coil part 42 and the S-pole moves away from the coil part 42, and the movable part 2 rotates clockwise and tilts while torsionally deforming the movable part-side beams 5a, 6a. Further, the counter-clockwise rotation or the clockwise rotation of the movable part 2 is absorbed by the torsion of the movable part-side beams 5a, 6a and has no influence on the rotation of the movable part 2 by the first drive units 20, 30.

Furthermore, in the first drive units 20, 30, since the poles at the light reflection surface 3a side of the first permanent magnets 213, 313 have different polarities from each other, the coil part 22 and the coil part 32 have poles at the sides opposed to the movable part 2 with the same polarity with each other. That is, the coil part 22 and the coil part 32 constantly repel each other. Thereby, the coil part 42 of the second drive unit 40 provided in the base part 161 close to the movable part 2 is hardly affected by the magnetic fields because the magnetic fields from the coil part 22 and the coil part 32 are cancelled.

Therefore, in the light scanner 1, the rotation of the movable part 2 around the axis in the Y-axis direction and the rotation of the movable part 2 around the axis in the X-axis direction may be individually and independently performed. That is, the rotation of the movable part 2 by the first drive units 20, 30 is not affected by the rotation of the movable part 2 by the second drive unit 40, and, in reverse, the rotation of the movable plate 2 by the second drive unit 40 is not affected by the rotation of the movable part 2 by the first drive units 20, 30. Accordingly, the light scanner 1 may stably rotate the movable part 2 around the respective axes in the Y-axis direction and the X-axis direction.

Figure 6:
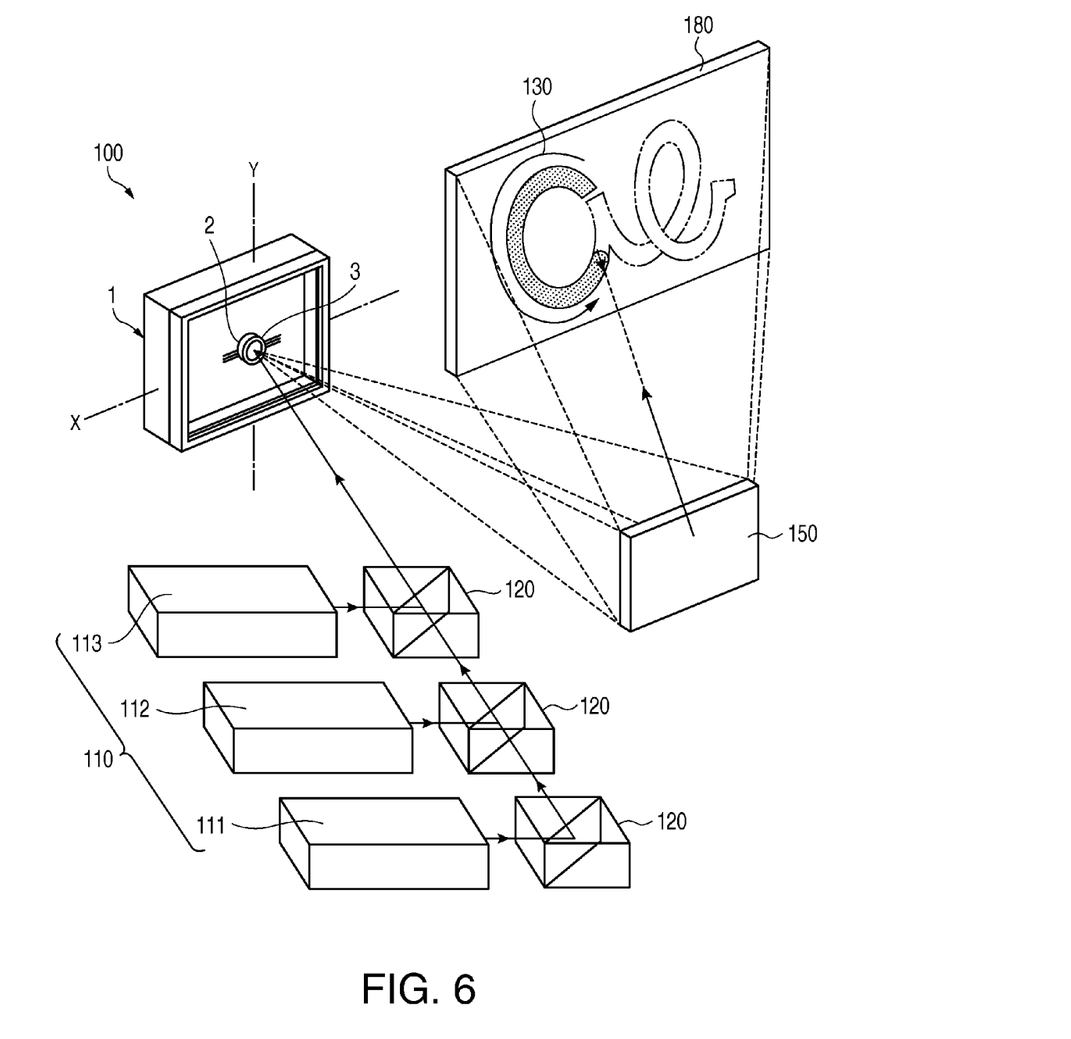
FIG. 6 is a schematic diagram showing an outline of an image forming apparatus according to the invention.

The light scanner 1 described as above may be preferably applied to an image forming apparatus such as a projector, a laser printer, a display for imaging, a barcode reader, or a scanning confocal microscope, for example. FIG. 6 is a schematic diagram showing an outline of an image forming apparatus according to the embodiment of the invention. FIG. 6 shows a projector 100 as an image forming apparatus. Here, the longitudinal direction of a screen 180 is referred to as "horizontal direction" and a direction orthogonal to the longitudinal direction is referred to as "vertical direction". The projector 100 has a light source unit 110 that outputs light such as laser, plural dichroic mirrors 120, and the light scanner 1.

The light source unit 110 includes a red light source 111 that outputs red light, a blue light source 112 that outputs blue light, and a green light source 113 that outputs green light. The respective dichroic mirrors 120 are optical devices that combines lights respectively output from the red light source 111, the blue light source 112, and the green light source 113. The projector 100 combines the lights output from the light source unit 110 using the dichroic mirrors 120 based on image information from a host computer (not shown), the combined light is used for two-dimensional scanning by the light scanner 1, and a color image is formed on the screen 180 via a fixed mirror 150.

At two-dimensional scanning, the movable part 2 of the light scanner 1 rotates around the axis in the Y-axis direction, and scanning (main scanning) is performed in the horizontal direction of the screen 180 with the light reflected by the light reflection surface 3a of the reflection plate 3. On the other hand, the movable part 2 of the light scanner 1 rotates around the axis in the X-axis direction, and scanning (sub-scanning) is performed in the vertical direction of the screen 180 with the light reflected by the light reflection surface 3a. The scanning of light by the light scanner 1 may be performed by the so-called raster scanning or the so-called vector scanning. Particularly, in the light scanner 1, its configuration is suitable for vector scanning, and scanning of light is preferably performed by the vector scanning.

The vector scan preferable for the light scanner 1 is a method of scanning the screen 180 with the light output from the light source unit 110 to sequentially form line segments connecting different two points on the screen 180. That is, the vector scan is a method of forming a desired image on the screen 180 by collecting infinitesimal lines. The light scanner 1 can irregularly and continuously displace the movable part 2 around the axis in the Y-axis direction and the axis in the X-axis direction, and is particularly suitable for the vector scanning.

In the specific explanation, when characters (a and b) shown in FIG. 6 are drawn by the vector scanning, scanning is performed with the light output from the light source unit 110 to write the respective characters. In this regard, irregular scanning of light may be performed along a scanning trajectory 130 by respectively controlling the position (rotation) around the axis in the X-axis direction and the position (rotation) around the axis in the Y-axis direction of the movable part 2 of the light scanner 1, and the characters a and b may be drawn in a traversable manner. According to the vector scanning, it is not necessary to scan the entire surface of the screen 180 with light unlike the raster scanning, and images may be efficiently drawn. Note that, in FIG. 6, after two-dimensional scanning with the light combined by the dichroic mirrors 120 by the light scanner 1, the light is reflected by the fixed mirror 150, and then, the image is formed on the screen 180, however, the fixed mirror 150 may be omitted and the light after two-dimensional scanning may be applied directly to the screen 180.

The main advantages of the light scanner 1 in the above described embodiment will be described.

(1) The light scanner 1 has a function of providing displacement to the movable part 2 without mutual influence on the first drive units 20, 30 and the second drive unit 40. Thereby, in the light scanner 1, the movable part 2 may individually and stably rotate around the axis in the X-axis direction or the Y-axis direction and reflect light in an arbitrary direction. Further, since the second drive unit 40 has a configuration without any movable beam or drive beam, the light scanner 1 may be made smaller.

(2) The first drive units 20, 30 of the light scanner 1 have the first permanent magnets 213, 313 and the coils 221, 321, and the second drive unit 40 has the support member 41 as the second permanent magnet and the coil 421. Further, the movable part 2 is rotated by generating the magnetic field from the coils 221, 321 or the coil 421 for the first permanent magnets 213, 313 or the support member 41 and attracting either pole side of the first permanent magnets 213, 313 or the support member 41. As described above, the light scanner 1 may freely and easily displace the movable part 2 using the configuration that simply changes polarities of the coils 221, 321, 421 by application of voltages.

(3) In the light scanner 1, the first permanent magnets 213, 313 have the respective poles located at the side of the light reflection surface 3a with different polarities from each other, and voltages are applied so that the respective poles at the sides opposed to the first permanent magnets 213, 313 of the coils 221, 321 of the first drive units 20, 30 located at both ends of the movable beams 5, 6, respectively, may have the same polarity. That is, the coils 221, 321 repel each other. Therefore, the magnetic fields by the coils 221, 321 have little influence on the coil 421 of the second drive unit 40. Thereby, the second drive unit 40 may individually rotate the movable part 2 around the center axis in the X-axis direction with little influence by the magnetic field of the first drive units 20, 30.

(4) In the light scanner 1, the support member 41 also functions as the second permanent magnet in addition to supporting of the reflection plate 3. Thereby, in the light scanner 1, the support member only for supporting the reflection plate 3 may be eliminated, the movable part 2 can be made lighter, and reduction of the magnetic field intensity necessary for displacement, reduction of the number of parts, or the like may be realized.

Further, the light scanner 1 and the projector 100 as the image forming apparatus are not limited to the above described embodiments, but the same advantages may be obtained by the following modified examples.

MODIFIED EXAMPLE 1

Figure 7A:
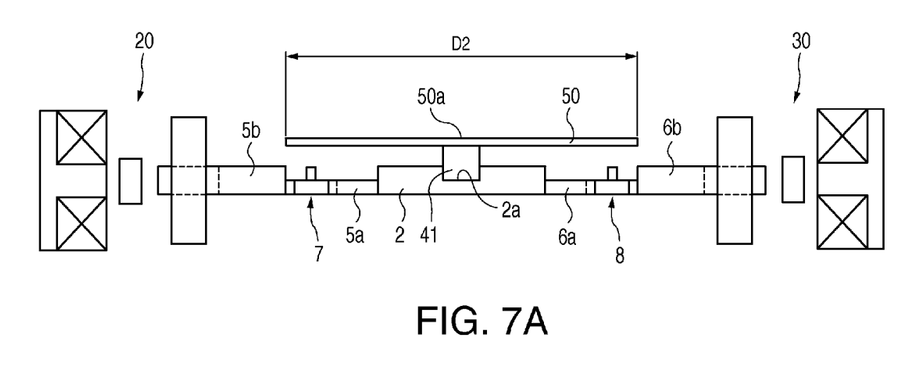
FIG. 7A is a sectional view showing a modified example of the light scanner.
Figure 7B:
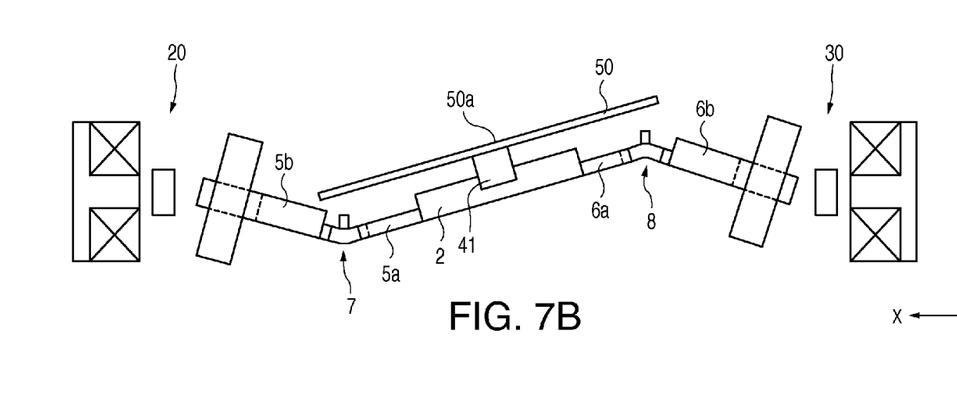
FIG. 7B is a sectional view showing driving of the first drive unit in the modified example.

The reflection plate 3 of the light scanner 1 has the circular shape having the diameter of D1 as approximation to the movable part 2, however, not limited to the configuration. The reflection plate may have a circular shape having a diameter D2 larger than that of the movable part 2 as long as the movable beams 5, 6 may function. FIG. 7A is a sectional view showing a modified example of the light scanner, and FIG. 7B is a sectional view showing driving of the first drive unit in the modified example. As shown in FIG. 7A, a reflection plate (light reflection member) 50 supported on the movable part 2 by the support member 41 has a light reflection surface 50a in an opposite direction to the movable part 2, and has a size such that its circumferential ends may reach displacement part-side beams 5b, 6b over the bending parts 7, 8. Even with the reflection plate 50 having the size, because the light reflection surface 50a is separated from the movable part 2 by the support member 41, when the first drive units 20, 30 drive and the reflection plate 50 rotates and tilts as shown in FIG. 7B, the plate does not come into contact with the movable beams 5, 6 and the bending parts 7, 8. That is, the reflection plate 50 may rotate similarly to the reflection plate 3, and further, may reflect more luminous fluxes at a time. Contrary, the reflection plate may have a circular shape smaller than that of the movable part 2.

MODIFIED EXAMPLE 2

Figure 8:
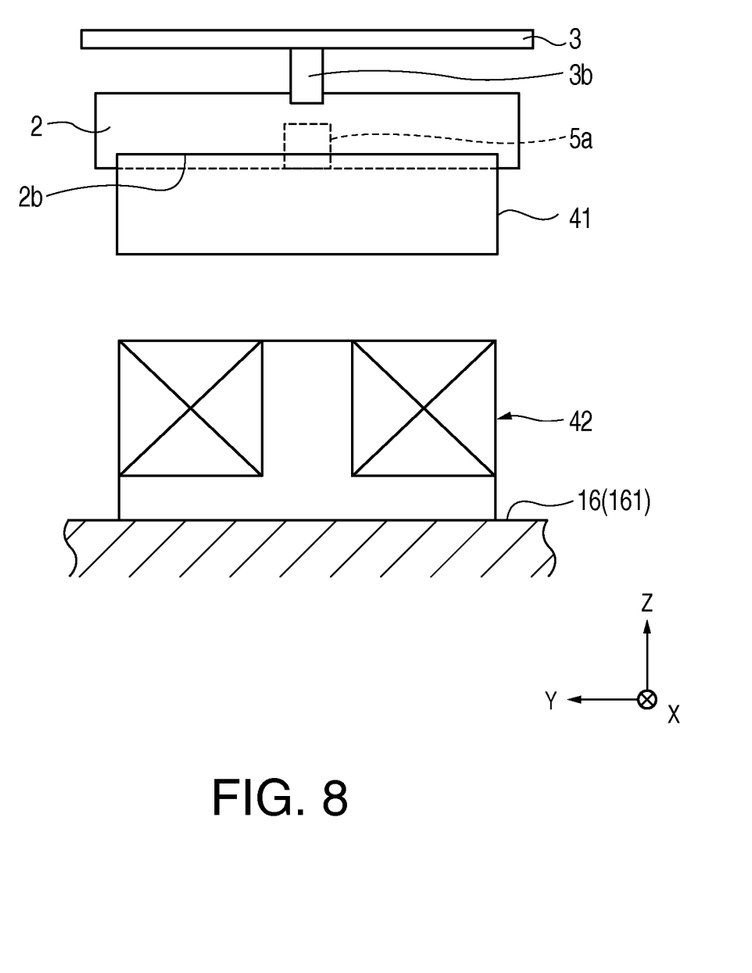
FIG. 8 is a sectional view showing a modified example of the light scanner.

The support member 41 has a function of supporting the reflection plate 3 toward the movable part 2 and a function of displacing the movable part 2 as the second permanent magnet of the second drive unit 40, and these functions may be provided separately. FIG. 8 is a sectional view showing a modified example of the light scanner. As shown in FIG. 8, the reflection plate 3 is supported toward the movable part 2 by a support member 3b formed in a circular shape using silicon or the like, and the support member 41 as the second permanent magnet may have a configuration attached to the groove of an alignment guide 2b formed on the surface at the coil part 42 side of the movable part 2 for displacing the movable part 2 as a magnet. That is, the support member 41 specializes in the function as the second permanent magnet. Thereby, the support member 41 as the permanent magnet and the coil part 42 directly face each other, and thus, the second drive unit 40 produces displacement more reliably and promptly.

MODIFIED EXAMPLE 3

In the light scanner 1, the shapes of the movable part 2 and the reflection plate 3 in the plan view are the circular shapes, however, not limited to those, for example, may be polygonal shapes such as rectangular shapes or square shapes, circular shapes, oval shapes, or the like. Further, the movable part 2 and the reflection plate 3 may not necessarily have the same shape.

MODIFIED EXAMPLE 4

The shapes of the displacement bodies 211, 311 of the displacement parts 21, 31 in the plan view are not particularly limited, but, for example, may be polygonal shapes such as square shapes, pentagonal shapes, or polygonal shapes with more apexes, circular shapes, or the like.

MODIFIED EXAMPLE 5

The first permanent magnets 213, 313 in the displacement parts 21, 31 have the rod shapes, however, not limited to those, for example, may be plate-like shapes or the like. In the case of the plate-like shapes, the permanent magnets are magnetized in the surface direction and fixed to the displacement bodies 211, 311. Thereby, the lengths of the permanent magnets in the X-axis direction may be made shorter, and the moment of inertia generated with the rotation of the displacement bodies 211, 311 may be suppressed.

MODIFIED EXAMPLE 6

The light scanner 1 has the configuration in which the movable part 2 is rotated around the axis in the X-axis direction or the Y-axis direction under the condition that the first permanent magnet 213 and the first permanent magnet 313 have poles located at the light reflection surface 3a side with different polarities from each other, however, displacement other than the rotation may be provided by changing the arrangement of magnets and the application method of voltages. For example, it may be possible to vibrate the movable part 2 in the Z-axis direction or stay there without a tilt, and a variety of light reflection may be performed.

MODIFIED EXAMPLE 7

The first drive units 20, 30 and the second drive unit 40 have the first permanent magnets 213, 313 or the support member 41 as the second permanent magnet and the coil parts 22, 32 or the coil part 42, however, for example, may have permanent magnets rotatably provided in place of the coil parts 22, 32, 42. By quickly rotating the permanent magnets, the polarities at the sides opposed to the first permanent magnets 213, 313 or the support member 41 as the second permanent magnet may be changed like the coil parts 22, 32, 42.

MODIFIED EXAMPLE 8

In the light scanner 1, the vibration form in the vibrating substrate 4 is not particularly defined, however, for example, in the case where the movable part 2 is rotated via the coupling parts 11, 12 by the first drive units 20, 30, it is preferable that they drive in resonance with each other. In the resonance vibration, the same rotation is repeated for sinusoidal driving of the movable part 2, however, even large rotation can be driven with low power consumption. On the other hand, in the case where the movable part 2 is directly rotated by the second drive unit 40 not via beams or the like, it is preferable that the second drive unit 40 and the movable part-side beams 5a, 6a supporting the rotation of the movable part 2 drive in non-resonance. In the non-resonance vibration, though the power consumption increases, the movable part 2 can be freely driven in small rotation. By the selection between the resonance vibration and the non-resonance vibration, the light scanner 1 may be optimally driven, and the scanner can be mounted on various image forming apparatus such as the projector 100.

The entire disclosure of Japanese Application No. 2010-180759, filed Aug. 12, 2010 is expressly incorporated by reference herein.

What is claimed is:

1. A light scanner comprising:
a light reflection part having a light reflection surface;
a movable part having the light reflection part and being rotatable around a first rotation center axis and a second rotation center axis orthogonal to the first rotation center axis, the movable part being supported only by a pair of movable beams extending from the moveable part and oppositely provided with the moveable part in between;
a pair of displacement parts connected to each of the movable beams and producing displacement of rotating the movable part around the first rotation center axis;
a pair of first drive part that drive each of the displacement parts;
a pair of drive beams extending from the displacement parts in parallel to the light reflection surface and orthogonal to an extension direction of the movable beams;
a support frame that supports the drive beams; and
a second drive part that rotates the movable part around the second rotation center axis,
wherein the movable beam has a bending part that bendingly deforms in a thickness direction of the support frame due to displacement of one of the displacement parts;
each of the displacement parts includes a first permanent magnet,
the first drive parts each include a coil that generates a magnetic field acting on the first permanent magnets,
the movable part includes a second permanent magnet, and
the second drive part includes a coil that generates a magnetic field acting on the second permanent magnet.

2. The light scanner according to claim 1, wherein the first permanent magnet has poles oppositely located in a direction orthogonal to the light reflection surface, and the first permanent magnets have poles located at the side of the light reflection surface with different polarities from each other.

3. The light scanner of claim 1, wherein the first drive part is axially spaced away from the displacement part.

4. The light scanner according to claim 1, wherein the second permanent magnet is provided in the movable part so that poles may be opposed in a direction along the light reflection surface and orthogonal to the extension direction of the movable beams.

5. The light scanner according to claim 2, wherein the second permanent magnet is provided in the movable part to support the light reflection part.

6. The light scanner according to claim 1, wherein the light reflection surface has a larger area than that of the movable part.

7. An image forming apparatus comprising:
a light source; and
a light scanner that performs scanning with light from the light source,
wherein the light scanner includes
a light reflection part having a light reflection surface,
a movable part having the light reflection part and being rotatable around a first rotation center axis and a second rotation center axis orthogonal to the first rotation center axis, the movable part being supported only by a pair of movable beams extending from the movable part and oppositely provided with the movable part in between,
a pair of displacement parts connected to the movable beams and displacing the movable part to rotate around the first rotation center axis,
a pair of first drive part that drives the displacement parts,
a pair of drive beams extending from the displacement parts in parallel to the light reflection surface and orthogonal to an extension direction of the movable beams,
a support frame that supports the drive beams, and
a second drive part that rotates the movable part around the second rotation center axis, and
wherein the movable beam has a bending part that bendingly deforms in a thickness direction of the support frame due to displacement of the displacement parts;
the displacement parts each include a first permanent magnet,
the first drive parts each include a coil that generates a magnetic field acting on the first permanent magnets,
the movable part includes a second permanent magnet, and
the second drive part includes a coil that generates a magnetic field acting on the second permanent magnet.

8. The image forming apparatus according to claim 7, wherein the first permanent magnet has poles oppositely located in a direction orthogonal to the light reflection surface, and the first permanent magnets have poles located at the side of the light reflection surface with different polarities from each other.

9. The image forming apparatus of claim 7, wherein the first drive part is axially spaced away from the displacement part.

10. The image forming apparatus according to claim 7, wherein the second permanent magnet is provided in the movable part so that poles may be opposed in a direction along the light reflection surface and orthogonal to the extension direction of the movable beams.

11. The image forming apparatus according to claim 7, wherein the second permanent magnet is provided in the movable part to support the light reflection part.

12. The image forming apparatus according to claim 7, wherein the light reflection surface has a larger area than that of the movable part.

* * * * *